US008208587B2

(12) United States Patent
Chong et al.

(10) Patent No.: US 8,208,587 B2
(45) Date of Patent: Jun. 26, 2012

(54) METHOD AND SYSTEM FOR JOINT TIME-OF-ARRIVAL AND AMPLITUDE ESTIMATION BASED ON A SUPER-RESOLUTION TECHNIQUE

(75) Inventors: Chia-Chin Chong, Santa Clara, CA (US); Fujio Watanabe, Union City, CA (US); Hiroshi Inamura, Cupertino, CA (US)

(73) Assignee: NTT DoCoMo, Inc., Tokyo (JP)

( * ) Notice: Subject to any disclaimer, the term of this patent is extended or adjusted under 35 U.S.C. 154(b) by 1104 days.

(21) Appl. No.: 12/106,188

(22) Filed: Apr. 18, 2008

(65) Prior Publication Data

US 2008/0267304 A1 Oct. 30, 2008

Related U.S. Application Data

(60) Provisional application No. 60/914,523, filed on Apr. 27, 2007.

(51) Int. Cl.
*H03D 1/00* (2006.01)
*H04L 27/06* (2006.01)
(52) U.S. Cl. ............................. 375/340; 455/65; 455/296
(58) Field of Classification Search .................. 375/260, 375/340; 455/65, 296
See application file for complete search history.

(56) References Cited

U.S. PATENT DOCUMENTS

| | | | |
|---|---|---|---|
| 6,148,041 A | 11/2000 | Dent | |
| 6,236,354 B1 | 5/2001 | Krasner | |
| 6,266,014 B1 | 7/2001 | Fattouche et al. | |
| 6,510,186 B1 | 1/2003 | Chen et al. | |
| 2003/0012267 A1* | 1/2003 | Jitsukawa et al. | 375/148 |
| 2003/0142587 A1 | 7/2003 | Zeitzew | |
| 2005/0113042 A1* | 5/2005 | Felter | 455/121 |
| 2005/0157810 A1* | 7/2005 | Raleigh et al. | 375/267 |
| 2005/0281363 A1 | 12/2005 | Qi et al. | |
| 2008/0130794 A1* | 6/2008 | Chong et al. | 375/317 |
| 2010/0295731 A1* | 11/2010 | Chong et al. | 342/387 |

OTHER PUBLICATIONS

Chong, C., "Joint Detection-Estimation of Directional Channel Parameters Using the 2-D Frequency Domain SAGE Algorithm with Serial Interference Cancellation", 2002, IEEE International Conference on Communication, vol. 2, pp. 906-910.*
Fleury, B., "Channel Parameter Estimation in Mobile Radio Environments Using the SAGE Algorithm", 1999, IEEE Journal of Selected Areas in Communications, vol. 17, pp. 434-450.*

(Continued)

*Primary Examiner* — Shuwang Liu
*Assistant Examiner* — Sung Ahn
(74) *Attorney, Agent, or Firm* — Haynes and Boone, LLP (57) ABSTRACT

In a geolocation application, a method is provided to jointly estimate the time-of-arrival (TOA) and the amplitude of a received signal based on super-resolution technique. The super-resolution joint TOA-amplitude estimators are provided based on either the expectation-maximization (EM), parallel-interference-cancellation space-alternating generalized expectation maximization (PIC-SAGE) or serial-interference-cancellation SAGE (SIC-SAGE). The SIC-SAGE estimator minimizes the ranging estimation error especially under a non-line-of-sight (NLOS) condition. The SIC-SAGE estimator is a simplified version of the maximum likelihood estimator with more stable performance in a multipath rich environment, such as the ultra-wideband (UWB) based applications. These techniques provide the following benefits: 1) it is generic, so that signal processing can be deployed on both time-domain (e.g., UWB impulse-radio) and frequency-domain (e.g., multi-band orthogonal frequency-division multiplexing (MB-OFDM)) based transceiver schemes and applicable for both UWB and non-UWB systems; 2) it is robust especially under NLOS condition and multipath rich environment.

13 Claims, 9 Drawing Sheets

Functional block diagram of the frequency-domain based receiver with the super-resolution TOA-amplitude estimator.

OTHER PUBLICATIONS

Tan, C., "Multi-Dimensional DFT Beamspace SAGE Super-Resolution Algorithm",2003, Personal Mobile Communications Conference, 2003. 5th European, Pub. No. 492, pp. 54-59.*

Chong, C. "Joint Detection-Estimation of Directional Channel Parameters Using the 2-D Frequency Domain SAGE Algorithm with Serial Interference Cancellation", 2002, IEEE International Conference on Communication, vol. 2, pp. 906-910.*

R. J. Fontana and S. J. Gunderson, "Ultra-wideband precision asset location system," in *Proc. of IEEE Conf. on Ultra Wideband Systems and Technologies (UWBST)*, Baltimore, MD, May 2002, pp. 147-150.

K. Yu and I. Oppermann, "An ultra wideband TAG circuit transceiver architecture," in *International Workshop on Ultra Wideband Systems. Joint UWBST and IWUWBS 2004.*, Kyoto, Japan, May 2004, pp. 258-262.

D. Dardari, "Pseudo-random active UWB reflectors for accurate ranging," *IEEE Commun. Lett.*, vol. 8, No. 10, pp. 608-610, Oct. 2004.

Gezici, Z. Tian, G. B. Giannakis, H. Kobayashi, A. F. Molisch, H. V. Poor, and Z. Sahinoglu, "Localization via ultrawideband radios: a look at positioning aspects for future sensor networks," *IEEE Signal Processing Mag.*, vol. 22, pp. 70-84, Jul. 2005.

Y. Qi, H. Kobayashi, and H. Suda, "Analysis of wireless geolocation in a non-line-of-sight environment," *IEEE Trans. Wireless Commun.*, vol. 5, No. 3, pp. 672-681, Mar. 2006.

K. Yu and I. Oppermann, "Performance of UWB position estimation based on time-of-arrival measurements," in *International Workshop on Ultra Wideband Systems. Joint UWBST and IWUWBS 2004*, Kyoto, Japan, May 2004, pp. 400-404.

I. Guvenc, Z. Sahinoglu, A. F. Molisch, and P. Orlik, "Non-coherent TOA estimation in IR-UWB systems with different signal waveforms," in *Proc. IEEE Int. Workshop on Ultrawideband Networks (UWBNETS)*, Boston, MA, Oct. 2005, pp. 245-251.

D. Dardari, C.-C. Chong, and M. Z. Win, "Improved lower bounds on time-of-arrival estimation error in realistic UWB channels," in *Proc. IEEE Int. Conf. on Ultra-Wideband (ICUWB)*, Waltham, MA, Sep. 2006, pp. 531-537.

D. Dardari, C.-C. Chong, and M. Z. Win, "Analysis of threshold-based ToA estimators in UWB channels," in *Proc. of European Signal Processing Conf. (EUSIPCO)*, Florence, Italy, Sep. 2006.

M. Z. Win and R. A. Scholtz, "Characterization of ultra-wide bandwidth wireless indoor communications channel: A communication theoretic view," *IEEE J. Select. Areas Commun.*, vol. 20, No. 9, pp. 1613-1627, Dec. 2002.

V. Lottici, A. D'Andrea, and U. Mengali, "Channel estimation for ultra-wideband communications," *IEEE J. Select. Areas Commun.*, vol. 20, No. 9, pp. 1638-1645, Dec. 2002.

A. Rabbachin, I. Oppermann, and B. Denis, "ML time-of-arrival estimation based on low complexity UWB energy detection," in *Proc. IEEE Int. Conf. on Ultra-Wideband (ICUWB)*, Waltham, MA, Sep. 2006, pp. 599-604.

H. Saarnisaari, "ML time delay estimation in a multipath channel," in *International Symposium on Spread Spectrum Techniques and Applications*, Mainz, Germany, Sep. 1996, pp. 1007-1011.

J.-Y. Lee and R. A. Scholtz, "Ranging in a dense multipath environment using an UWB radio link," *IEEE J. Select. Areas Commun.*, vol. 20, No. 9, pp. 1677-1683, Dec. 2002.

H. L. Van Trees, *Detection, Estimation, and Modulation Theory*, 1st ed. New York, NY 10158-0012: John Wiley & Sons, Inc., 1968.

C. Falsi, D. Dardari, L. Mucchi, and M. Z. Win, "Time of arrival estimation for UWB localizers in realistic environments," *EURASIP J. Appl. Signal Processing*, vol. 2006, pp. 1-13.

C.-C. Chong and F. Watanabe, "A Method for Optimum Threshold Selection of Time-of-Arrival Estimators," Filed: Dec. 3, 2007, DoCoMo Application Number: PA-0567, U.S. Appl. No. 11/949,152.

Guvenc and Z. Sahinoglu, "Threshold-based TOA estimation for impulse radio UWB systems," in *Proc. IEEE Int. Conf. on Utra-Wideband (ICU)*, Zurich, Switzerland, Sep. 2005, pp. 420-425.

P. Cheong, A. Rabbachin, J. Montillet, K. Yu, and I. Oppermann, "Synchronization, TOA and position estimation for low-complexity LDR UWB devices," in *Proc. IEEE Int. Conf. on Utra-Wideband (ICU)*, Zurich, Switzerland, Sep. 2005, pp. 480-484.

A. Rabbachin, J.-P. Montillet, P. Cheong, A. Rabbachin, G. T. F. de Abreu, and I. Oppermann, "Non-coherent energy collection approach for TOA estimation in UWB systems," in *Proc. Int. Symp. on Telecommunications (IST)*, Shiraz, Iran, Sep. 2005.

R. Moddemeijer, "On the determination of the position of extrema of sampled correlators," *IEEE Trans. Acoust., Speech, Signal Processing*, vol. 39, No. 1, pp. 216-291, Jan. 1991.

A. Jakobsson, A. L. Swindlehurst, and P. Stoica, "Subspace-based estimation of time delays and Doppler shift," *EEE Trans. Acoust., Speech, Signal Processing*, vol. 46, No. 9, pp. 2472-2483, Sep. 1998.

M. Latva-aho, "Advanced receivers for CDMA systems," Acta Uniersitatis Ouluensis, C125, pp. 179.

T. Manabe and H. Takai, "Superresolution of multipath delay profiles measured by PN correlation method," *IEEE Trans. Antennas Propagat.*, vol. 40, No. 5, pp. 500-509, May. 1992.

A. Dempster, N. Laird, and D. Rubin, "Maximum likelihood from incomplete data via the EM algorithm," *Journal of the Royal Statistical Society, Series B*, vol. 39, No. 1, pp. 1-38, 1977.

M. Feder and E. Weinstein, "Parameter estimation of superimposed signals using the EM algoirthm," *IEEE Trans. Acoust., Speech, Signal Processing*, vol. 36, No. 4, pp. 477-489, Apr. 1988.

H. Fleury, M. Tschudin, R. Heddergott, D. Dahlhaus, and K. I. Pedersen, "Channel parameter estimation in mobile radio environments using the SAGE algorithm," *IEEE J. Select. Areas Commun.*, vol. 17, No. 3, pp. 438-450, Mar. 1999.

C.-C. Chong and F. Watanabe, "A Method for Optimum Bandwidth Selection of Time-of-Arrival Estimators," Filed: Dec. 21, 2007, DoCoMo Application Number: Pa-0574, U.S. Appl. No. 11/963,630.

PCT International Search Report for International Application No. PCT/US2008/060999 dated Dec. 15, 2008, 2 pages.

PCT Written Opinion of the International Searching Authority for International Application No. PCT/US2008/060999 dated Dec. 15, 2008, 4 pages.

* cited by examiner

FIG 1: Illustration of a typical multipath channel impulse response.

-Prior Art-

FIG 2: Functional block diagram of the time-domain based receiver with the super-resolution TOA-amplitude estimator.

FIG 3: Functional block diagram of the frequency-domain based receiver with the super-resolution TOA-amplitude estimator.

FIG 4: The super-resolution TOA-amplitude estimators based on either EM, PIC-SAGE or SIC SAGE technique.

FIG 5: The relationship between the complete and incomplete data.

FIG 6: The signal flow graph of the EM estimator.

FIG 7: The signal flow graph of the PIC-SAGE estimator.

FIG 8: The signal flow graph of the SIC-SAGE estimator.

FIG 9: Implementation of the cost function in equation (11).

FIG 10: Implementation of the cost function in equation (12) with AOA information.

METHOD AND SYSTEM FOR JOINT TIME-OF-ARRIVAL AND AMPLITUDE ESTIMATION BASED ON A SUPER-RESOLUTION TECHNIQUE

CROSS-REFERENCE TO RELATED APPLICATIONS

The present application is related to and claims priority to U.S. provisional patent application Ser. No. 60/914,523, entitled "A Method and System for Joint Time-of-Arrival and Amplitude Estimation Based on Super-Resolution Technique," filed on Apr. 27, 2007. The U.S. provisional patent application is hereby incorporated by reference in its entirety.

BACKGROUND OF THE INVENTION

1. Field of the Invention

The present invention relates to a geolocation technique. In particular, the present invention relates to a geolocation technique that can estimate both time-of-arrival and amplitude of the received signal using a super-resolution technique.

2. Discussion of the Related Art

The need for accurate geolocation has intensified in recent years, especially in cluttered environments (e.g., inside buildings, in urban locales, and foliage), where the Global Positioning System (GPS) is often inaccessible. Unreliable geolocation hinders various applications, for example the tracking of inventory in warehouses or cargo ships in commercial settings, and blue force tracking for locating friendly forces in military scenarios. Ultra-wideband (UWB) technology offers great potential for achieving high positioning accuracy in such cluttered environments due to its ability to resolve multipath and penetrate obstacles. Discussions of positioning using UWB technology may be found, for example, in (a) R. J. Fontana and S. J. Gunderson, "Ultra-wideband precision asset location system," in *Proc. of IEEE Conf on Ultra Wideband Systems and Technologies (UWBST)*, Baltimore, Md., May 2002, pp. 147-150; (b) L. Stoica, S. Tiuraniemi, A. Rabbachin, I Oppermann, "An ultra wideband TAG circuit transceiver architecture," in *International Workshop on Ultra Wideband Systems. Joint UWBST and IWUWBS* 2004, Kyoto, Japan, May 2004, pp. 258-262; (c) D. Dardari, "Pseudo-random active UWB reflectors for accurate ranging," *IEEE Commun. Lett.*, vol. 8, no. 10, pp. 608-610, October 2004; (d) S. Gezici, Z. Tian, G. B. Giannakis, H. Kobayashi, A. F. Molisch, H. V. Poor, and Z. Sahinoglu, "Localization via ultrawideband radios: a look at positioning aspects for future sensor networks," *IEEE Signal Processing Mag.*, vol. 22, pp. 70-84, July 2005; and (e) Y. Qi, H. Kobayashi, and H. Suda, "Analysis of wireless geolocation in a non-line-of-sight environment," *IEEE Trans. Wireless Commun.*, vol. 5, no. 3, pp. 672-681, March 2006.

For localization systems based on the UWB technology, it is natural to deploy the time-of-arrival (TOA) technique in order to exploit the fine time resolution of a UWB signal. However, ranging accuracy may be limited by noise, multipath components (MPCs), the effects of system bandwidth, and non-line-of-sight (NLOS) conditions. Most ranging techniques are based on the TOA estimation of the first path. Examples of localization systems using TOA techniques include (a) K. Yu and I. Oppermann, "Performance of UWB position estimation based on time-of-arrival measurements," in *International Workshop on Ultra Wideband Systems. Joint UWBST and IWUWBS* 2004, Kyoto, Japan, May 2004, pp. 400-404; (b) I. Guvenc, Z. Sahinoglu, A. F. Molisch, and P. Orlik, "Non-coherent TOA estimation in IR-UWB systems with different signal waveforms," in *Proc. IEEE Int. Workshop on Ultrawideband Networks (UWBNETS)*, Boston, Mass., October 2005, pp. 245-251; and (c) D. Dardari, C.-C. Chong, and M. Z. Win, "Threshold-based time-of-arrival estimators in UWB dense multipath channels," *IEEE Trans. Commun.*, in press ("Dardari").

Generally, however, the first path is not necessarily the strongest path, so that an estimation of the TOA is challenging in dense multipath channels. The problem of an accurate TOA estimation in a multipath environment is closely related to the problem of channel estimation, in which channel amplitudes and TOAs can be jointly estimated using, for example, a maximum likelihood (ML) approach. ML approaches are discussed, for example, in (a) V. Lottici, A. D'Andrea, and U. Mengali, "Channel estimation for ultra-wideband communications," *IEEE J. Select. Areas Commun.*, vol. 20, no. 9, pp. 1638-1645, December 2002; (b) A. Rabbachin, I. Oppermann, and B. Denis, "ML time-of-arrival estimation based on low complexity UWB energy detection," in *Proc. IEEE Int. Conf. on Ultra-Wideband (ICUWB)*, Waltham, Mass., September 2006, pp. 599-604; (c) H. Saarnisaari, "ML time delay estimation in a multipath channel," in *International Symposium on Spread Spectrum Techniques and Applications*, Mainz, GERMANY, September 1996, pp. 1007-1011 ("Saarnisaari"); and (d) J.-Y. Lee and R. A. Scholtz, "Ranging in a dense multipath environment using an UWB radio link," *IEEE J. Select. Areas Commun.*, vol. 20, no. 9, pp. 1677-1683, December 2002 ("Lee"). Most ML estimators are complex, so as to incur high implementation costs and high power consumption.

In addition, complex channel estimators are not always good TOA estimators. In fact, for certain signal-to-noise-ratio (SNR) ranges, Saarnisaari shows that the ML channel estimator performs poorly in estimating the TOA of the first path, when compared to a simple threshold-based TOA estimator. Lee discloses a generalized ML-based TOA estimation technique that is applied to UWB, assuming that the strongest path is perfectly locked and the relative delay of the first path is estimated. Lee's UWB ranging system uses a correlator and a parallel sampler with a high-speed measurement capability in each transceiver, thereby accomplishing two-way ranging between the transceivers without a common clock. Lee's system suffers from a high implementation complexity which makes it impractical for low-cost sensor applications.

Some TOA estimation techniques estimate the strongest path and adopts the TOA of this strongest path as the estimated TOA for the received signal. As the first arriving path is not always the strongest path, especially under the NLOS condition in dense multipath channels, the resulting TOA estimates are therefore inaccurate.

Alternatively, TOA estimation can be accomplished using a peak-detection (i.e., classical correlation) estimator, where the received signal is correlated with the transmitted signal template and the position of the first detected maximum/local peak at the correlator output is regarded as the TOA. One example of this peak-detection technique is discussed in X. Chen, S. Zhang and S. Wu, "Signal time of arrival estimation method and system," U.S. Pat. No. 6,510,186, Jan. 21, 2003 ("Chen"). Chen discloses a system including a channel estimator and a correlator, in which the channel estimator is used to estimate a channel response from a received signal. The channel response, together with an ideal channel response estimated based on the peak-detection method, are then used in the correlator to estimate a time delay.

Another example of a peak-detection estimator is disclosed in C. Falsi, D. Dardari, L. Mucchi, and M. Z. Win, "Time of arrival estimation for UWB localizers in realistic environments," *EURASIP J. Appl. Signal Processing*, vol. 2006, pp. 1-13 ("Falsi"). In Falsi, three estimation strategies are disclosed for the peak detection estimator. The strategies are, in increasing complexity, (a) single-search (SS); (b) search-and-subtract (SaS); and (c) search-subtract-and-readjust (SSaR). The SS strategy does not require a complex computation process. Therefore, the SS strategy may be used as a very low complexity approach, which may be followed by the SaS and SSaR strategies, when necessary. However, none of the strategies give a good estimate under NLOS conditions, when the first arriving path is weak.

While most peak-detection TOA estimators have lower implementation complexity, relative to ML-based estimators, their performance degrades under low SNR conditions. Furthermore, peak-detection TOA estimators provide poor TOA estimates under NLOS conditions when the first arriving path is weak.

Still another example of a simple technique for detecting the first arriving path in a harsh propagation environment is to compare the output of the receiver with a threshold whose value is optimized according to the operating condition (e.g., SNR). Recently, threshold-based estimators (e.g., those disclosed in Dardari, above) are gaining interests. Other threshold-based estimator examples include (a) copending U.S. patent application ("Copending Application I"), entitled "Method for Optimum Threshold Selection of Time-of-Arrival Estimators," by C.-C. Chong and F. Watanabe, Ser. No. 11/949,152, filed on Dec. 3, 2007, based on a U.S. provisional patent application Ser. No. 60/868,526, filed on Dec. 4, 2006; (b) I. Guvenc and Z. Sahinoglu, "Threshold-based TOA estimation for impulse radio UWB systems," in *Proc. IEEE Int. Conf. on Ultra-Wideband (ICU)*, Zurich, Switzerland, September 2005, pp. 420-425; (c) P. Cheong, A. Rabbachin, J. Montillet, K. Yu, and I. Oppermann, "Synchronization, TOA and position estimation for low-complexity LDR UWB devices," in *Proc. IEEE Int. Conf on Ultra-Wideband (ICU)*, Zurich, Switzerland, September 2005, pp. 480-484; and (d) A. Rabbachin, J.-P. Montillet, P. Cheong, A. Rabbachin, G. T. F. de Abreu, and I. Oppermann, "Non-coherent energy collection approach for TOA estimation in UWB systems," in *Proc. Int. Symp. on Telecommunications (IST)*, Shiraz, Iran, September 2005.

Threshold-based estimators are attractive because of their simple designs, as complexity and computational constraints are often critical considerations in applications such as those involving low cost battery-powered devices (e.g., in wireless sensor networks). However, despite the low implementation complexity, these techniques do not give optimum ranging accuracy especially under NLOS conditions. In particular, most threshold-based TOA estimators work efficiently only under high SNRs or with long observation times (i.e., long preambles). Under low SNRs or short observation times (i.e., short preambles), threshold-based estimators tend to be biased, with large corresponding mean-square errors (MSEs). The large MSEs result from adjacent peaks with similar height due to noise, multipath, and pulse side lobes, all of which engender ambiguity in the selection of the correct peak, and thus result in ranging accuracy degradation. However, UWB systems are intended to operate in multipath environments with low SNRs.

Conventional TOA estimation approaches provide interference/inter-path cancellation based on recognizing the shape of the band limited transmitted pulse. See, for example, R. Moddemeijer, "On the determination of the position of extrema of sampled correlators," *IEEE Trans. Acoust., Speech, Signal Processing*, vol. 39, no. 1, pp. 216-291, January 1991 ("Moddemeijer"). Moddemeijer's approach is robust, but does not lead to a significant improvement in initial TOA estimation. Another approach uses subspace techniques, such as disclosed in A. Jakobsson, A. L. Swindlehurst, and P. Stoica, "Subspace-based estimation of time delays and Doppler shift," *IEEE Trans. Acoust., Speech, Signal Processing*, vol. 46, no. 9, pp. 2472-2483, September 1998. The subspace-based TOA estimation is very complex, requiring generating correlation matrices and their inverses, and performing a large number of matrix multiplications. As demonstrated in M. Latva-aho, "Advanced receivers for CDMA systems," Acta Uniersitatis Ouluensis, C125, pp. 179, subspaced-based estimators perform poorly in static or slow-moving channels. For example, the article "Superresolution of multipath delay profiles measured by PN correlation method," by T. Manabe and H. Takai, *IEEE Trans. Antennas Propagat.*, vol. 40, no. 5, pp. 500-509, May 1992 ("Manabe"), illustrates a subspace technique using eigenvector decomposition. Manabe's TOA estimation approach requires complex steps for calculating eigenvectors of the channel correlation matrix.

In general, the TOA estimators described above (e.g., ML-based, peak-detection, and threshold-based estimators) fail to reliably provide robust and accurate TOA ranging information under NLOS conditions and multipath-rich environments. Some TOA-based techniques are only applicable for UWB based systems and time-domain modulation schemes. Therefore, a more robust TOA estimator that accurately estimates TOA information under NLOS condition is highly desired.

SUMMARY OF THE INVENTION

To achieve higher ranging accuracy, the present invention provides a "super-resolution" TOA estimator which achieves a higher accuracy in a multipath rich environment, while requiring only a slight increase in complexity over a conventional threshold-based estimator. The performance of such a "super-resolution" TOA estimator is of provided herein. The estimators of the present invention are applicable to both time-domain and frequency-domain modulation schemes, in both UWB and non-UWB systems. Furthermore, the estimators of the present invention extend easily to provide also angle-of-arrival (AOA) estimations.

In one embodiment, a super-resolution TOA estimator of the present invention uses a time-domain modulation scheme in an UWB system (e.g., UWB impulse radio).

The advantages of the present invention include: 1) it is generic; can be deployed on both time-domain (e.g., UWB impulse-radio) and frequency-domain (e.g., multi-band orthogonal frequency-division multiplexing (MB-OFDM)) based transceiver schemes and applicable for both UWB and non-UWB systems; 2) it is robust especially under NLOS condition and multipath rich environment. In particular, the serial-interference-cancellation, space-alternating generalized expectation maximization (SIC-SAGE) estimator can be used to increase the TOA ranging accuracy in harsh multipath environment with low SNR and/or under NLOS condition. Despite the increase in implementation cost as compared to threshold-based estimators, the overall complexity of the SIC-SAGE estimator is still lower than the conventional ML based estimators. Thus, such a scheme can be used as an effective trade-off between accuracy and complexity.

The present invention is better understood upon consideration of the detailed description below, in conjunction with the accompanying drawings.

DETAILED DESCRIPTION OF THE PREFERRED EMBODIMENTS

Figure 1:
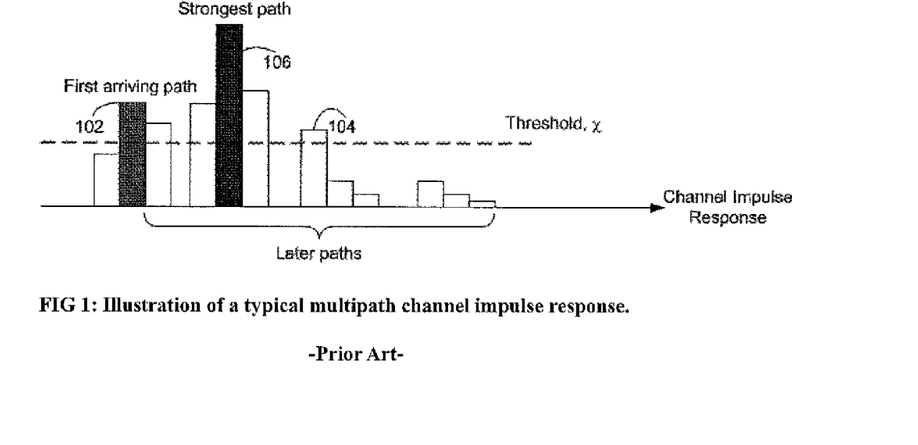
FIG. 1 illustrates a typical multipath channel impulse response.

FIG. 1 illustrates a typical multipath channel impulse response, which includes first arriving path 102 and strongest path 106 having signal amplitudes exceeding threshold value $\chi$. Copending Application I, which is hereby incorporated by reference in its entirety, shows that the first arriving path 102, and not the later arrivals 104 (including the strongest path 106) is significant to achieving ranging accuracy. Therefore, a multipath channel is given by $$h(t) = \sum_{l=1}^{L} \alpha_l \delta(t - \tau_l), \quad (1)$$

where L is the total number of paths, while $\alpha_l$ and $\tau_l$ are multipath amplitudes and the TOA for the l-th path, respectively. Based on equation (1), the time-domain received signal, r(t) after the multipath channel is given by $$r(t) = \sum_{l=1}^{L} s(t; \theta_l) + n(t), \quad (2)$$

where $$s(t; \theta_l) = \alpha_l \exp\{-j2\pi\phi_l t\} p(t - \tau_l), \quad (3)$$

in which p(t) is the transmit signal pulse with duration $T_p$, $\theta_l = [\tau_l, \alpha_l, \phi_l]$ is the parameter vector containing parameters, i.e., TOA, amplitude and phase, for the l-th path, respectively, and n(t) is the zero-mean, additive white Gaussian noise (AWGN) with a two-sided power spectral density $N_0/2$. With L different paths, all $\theta_l = [\tau_l, \alpha_l, \phi_l]$ can be represented by the matrix $\Theta = [\theta_1, \ldots, \theta_L]^T$, where $[\bullet]^T$ denotes the transposition operation.

Figure 2:
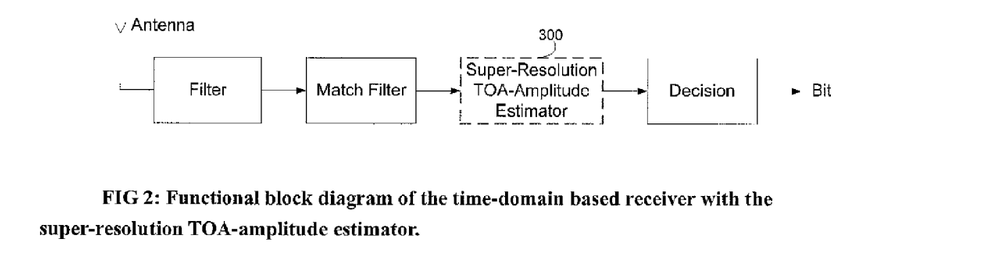
FIG. 2 is a functional block diagram of a time-domain receiver with "super-resolution" TOA-amplitude estimator 300, in accordance with one embodiment of the present invention.
Figure 3:
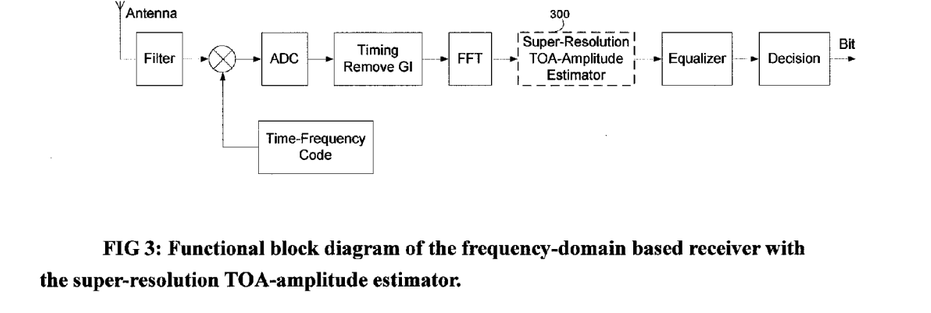
FIG. 3 is a functional block diagram of a frequency-domain receiver with "super-resolution" TOA-amplitude estimator 300, in accordance with one embodiment of the present invention.

The parameters for precision ranging is the TOA of the first arriving path, $\tau_1$, based on the received signal observed over the interval [0,T]. In a noisy and harsh environment, the first arriving path is usually weak and the detection of such a weak signal component in dense multipath channels can be particularly challenging. However, due to multipath, the received signal depends on a set of nuisance parameters denoted by $\{\tau_2, \tau_3, \ldots, \tau_L, \alpha_1, \alpha_2, \ldots, \alpha_L, \phi_1, \phi_2, \ldots, \phi_L\}$. Since the TOA estimation is now a joint channel estimation, not only $\tau_1$, but all parameters within matrix $\Theta$ are estimated. FIGS. 2 and 3 are functional block diagrams of a time-domain receiver and a frequency-domain receiver, respectively, each incorporating super-resolution TOA-amplitude estimator 300 of the present invention.

Figure 4:
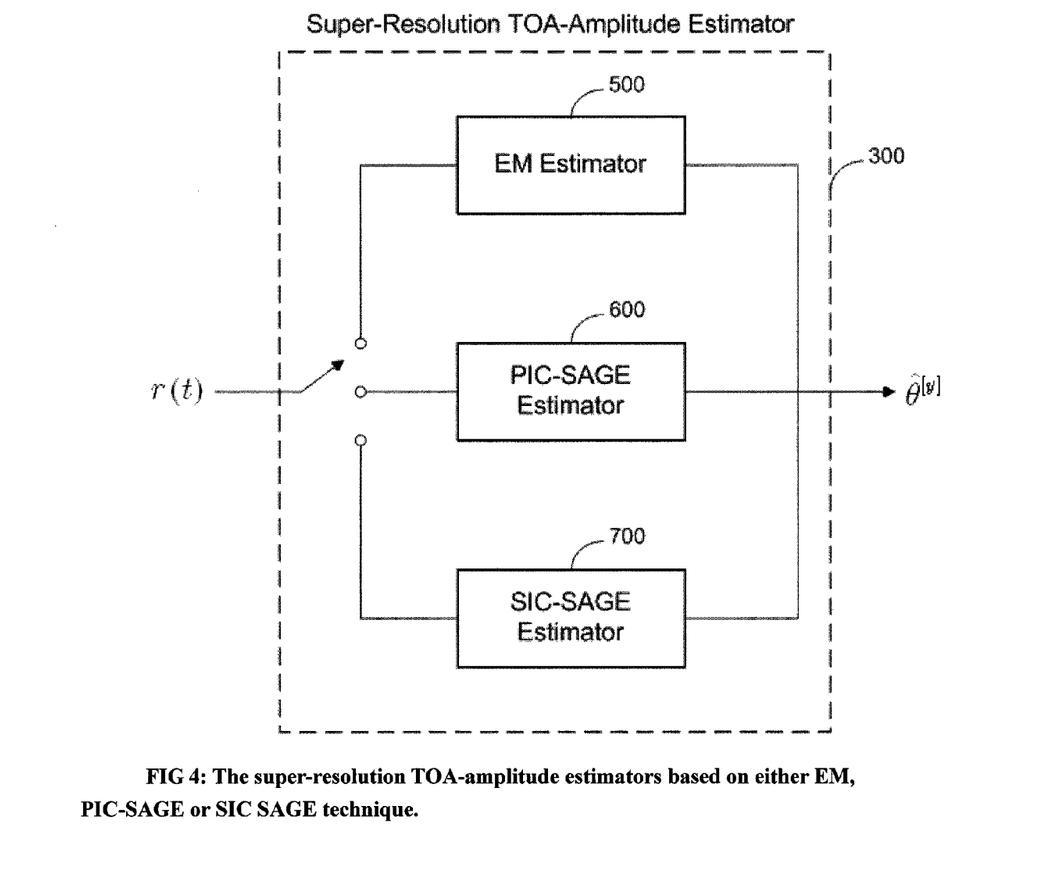
FIG. 4 shows a TOA-amplitude estimator based on expectation maximization (EM), or parallel-interference-cancellation space-alternating generalized expectation maximization (PIC-SAGE), or serial-interference-cancellation space-alternating generalized expectation maximization (SIC-SAGE) techniques, in accordance with one embodiment of the present invention.

FIG. 4 shows a TOA-amplitude estimator (e.g., super-resolution TOA-amplitude estimator 300 of FIGS. 2 and 3) based on expectation maximization (EM), or parallel-interference-cancellation space-alternating generalized expectation maximization (PIC-SAGE), or serial-interference-cancellation space-alternating generalized expectation maximization (SIC-SAGE) techniques, in accordance with one embodiment of the present invention.

The EM algorithm, which is disclosed in "Maximum likelihood from incomplete data via the EM algorithm," A. Dempster, N. Laird, and D. Rubin, *Journal of the Royal Statistical Society, Series B*, vol. 39, no. 1, pp. 1-38, 1977 ("Dempster"), is a general method for finding the ML estimates of parameters of an underlying distribution from a given data set, when the data set is incomplete or has missing values. The EM algorithm consists of two major steps: an expectation step (E-step) and a maximization step (M-step). The E-step calculates the expected values of the unknown underlying variables, using the current estimate of the parameters and conditioned upon the observations. The maximizing step then provides updates or new estimates of the parameters. These two steps are iterated until convergence is reached. The article "Parameter estimation of superimposed signals using the EM algorithm," M. Feder and E. Weinstein, *IEEE Trans. Acoust., Speech, Signal Processing*, vol. 36, no. 4, pp. 477-489, April 1988 ("Feder and Weinstein"), discloses a first application of the EM algorithm to estimate the time delay and source location based on superimposed signals. Feder and Weinstein decompose the observed data into their signal components and separately estimate the parameters of each signal component, thereby achieving considerable simplification in the computation involved.

The EM algorithm relies on the two key notions of the complete (unobservable) and incomplete (observable) data. Referring to equation (2), the time-domain received signal, r(t) is identified as the incomplete data and is related to the complete data, $x_l(t)$ according to $$r(t) = \sum_{l=1}^{L} x_l(t), \quad (4)$$

where $$x_l(t) = s(t; \theta_l) + \beta_l n(t), \quad (5)$$

and $\beta_l$ is the coefficient of the l-th path. The non-negative parameters $[\beta_1, \ldots, \beta_l, \ldots, \beta_L]$ satisfy $$\sum_{l=1}^{L} \beta_l = 1.$$

Figure 5:
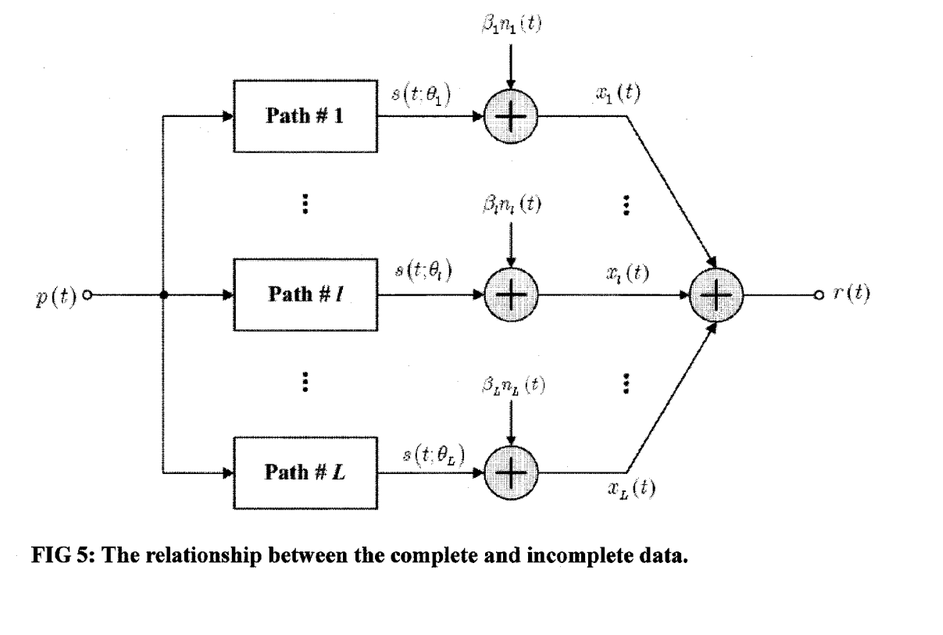
FIG. 5 illustrates the relationship between complete and incomplete signal data that can be used with any of the EM, PIC-SAGE and SIC-SAGE techniques.
Figure 6:
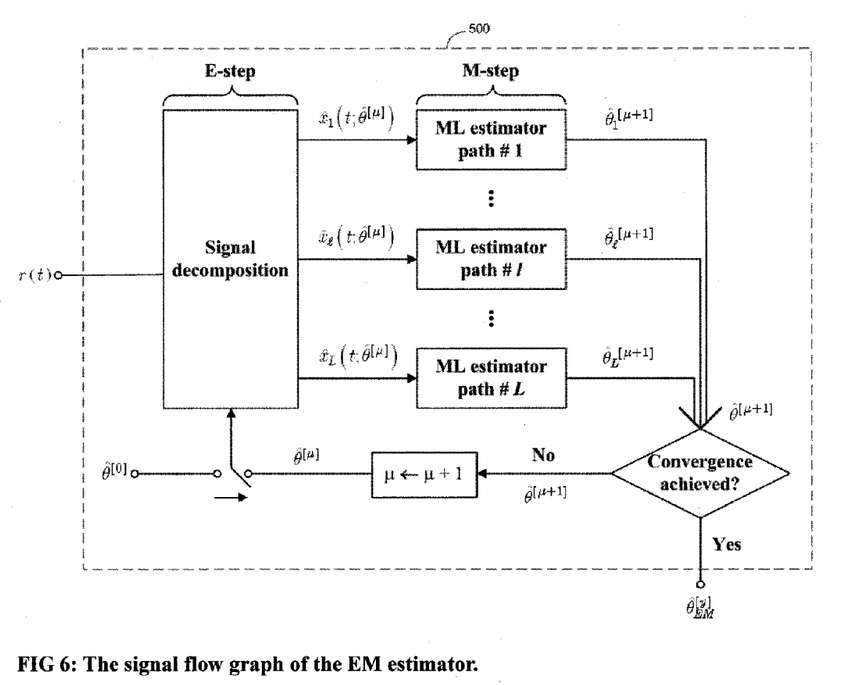
FIG. 6 is a signal flow graph of an EM estimator, according to one embodiment of the present invention.

That is, n(t) can be decomposed into L components (i.e., $\{\beta_1 n_1(t), \ldots, \beta_l n_l(t), \ldots, \beta_L n_L(t)\}$). FIG. 5 illustrates the relations between the complete data, $x_l(t)$, and the incomplete data, r(t). FIG. 6 shows a signal flow graph of the EM algorithm. As shown in FIG. 6, the received signal is decomposed in the E-step of each iteration to estimate the complete data $x_l(t)$, which is then used to provide the joint estimation of the parameters of the L paths, with each path being considered a separate maximum likelihood optimization problem. FIG. 6 shows that convergence may be achieved in a finite number (y) of iterations. As a result of decomposition and the finite number of iterations, computational complexity of the EM algorithm is significantly reduced as compared to a conventional ML-based estimator.

The SAGE algorithm (i.e., either one of the PIC-SAGE and SIC-SAGE algorithms) is a two-fold extension of the EM algorithm. First, each of the SAGE iterations is an EM iteration that re-estimates only a subset of the components of Θ, while keeping the estimates of the other components fixed at their previous values. The SAGE algorithm updates the parameters sequentially, rather than simultaneously, thereby allowing the computationally prohibitive high-dimensional non-linear optimization processes be replaced by several low-dimensional maximization procedures. The SAGE algorithm is deemed to have converged when the output of the pre-defined likelihood function at successive iterations reaches a steady state. Second, the complete data is mapped into the incomplete data in a random (rather than deterministic) manner. Generally, because of its faster convergence and reduced complexity, the SAGE algorithm is preferred to the EM algorithm.

Figure 7:
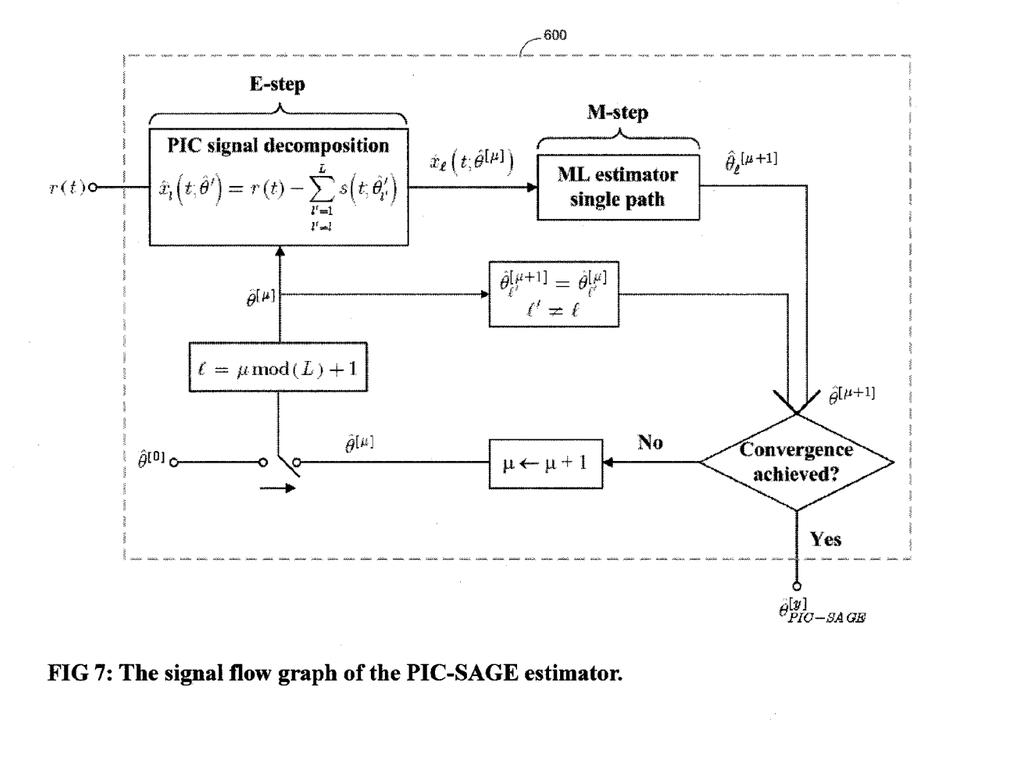
FIG. 7 is a signal flow graph of a PIC-SAGE estimator, according to one embodiment of the present invention.

As in the EM algorithm, the SAGE algorithm also relies on mapping of unobservable complete data to observable incomplete data. The SAGE algorithm was first introduced by the article "Channel parameter estimation in mobile radio environments using the SAGE algorithm," by B. H. Fleury, M. Tschudin, R. Heddergott, D. Dahlhaus, and K. I. Pedersen *IEEE J. Select. Areas Commun.*, vol. 17, no. 3, pp. 438-450, March 1999 to address multipath channel parameter estimation. As explained below, this version of the SAGE algorithm is referred to as the "PIC-SAGE" algorithm. FIG. 7 shows a signal flow graph for the PIC-SAGE algorithm. As shown in FIG. 7, in the E-step of the PIC-SAGE algorithm, unlike the E-step of the EM algorithm, only the complete data $x_l(t)$ for one path is estimated in each iteration, with the complete data $x_l(t)$ for all the other paths kept constant at their respective last estimated values. Note that, in the SAGE algorithm, the M-step is still the ML procedure for a single path, which is applied to the estimate of $x_l(t)$ with $\beta_l=1$. At the μ-th iteration step, the parameters of the path l=μ mod(L)+1 are estimated.

The joint estimation of the TOA and amplitude of the received signal for the purpose of precision ranging may be formulated under the SIC-SAGE algorithm. Similar to the EM and PIC-SAGE algorithms described above, the SIC-SAGE algorithm also relies on iterating an E-step and an M-step until convergence is reached. As shown in FIG. 7, during the E-step in the PIC-SAGE algorithm, the complete data for the l-th path, $\hat{x}_l(t;\hat{\theta}')$, is obtained by subtracting the estimated contribution of all L paths except the l-th path from the incomplete data, r(t) which can be expressed in equation form as follows:

$$\hat{x}_l(t;\hat{\theta}') = r(t) - \sum_{\substack{l'=1\\l'\neq l}}^{L} s(t;\hat{\theta}'_{l'}). \tag{6}$$

This algorithm is known as the PIC-SAGE algorithm because equation (6) is similar to the equation that characterizes the conventional parallel interference cancellation (PIC) technique for multiuser detection. The PIC-SAGE algorithm may diverge because of interference of a large power path with respect to the smaller power paths. Even when converged is reached, the PIC-SAGE algorithm may still provide erroneous estimates, especially in small power paths.

Figure 8:
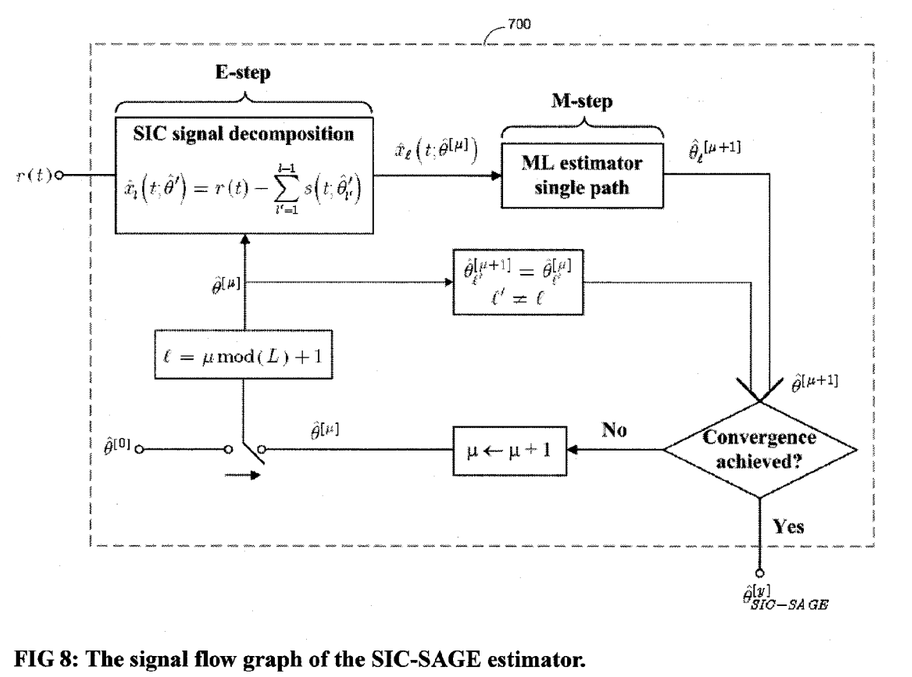
FIG. 8 is a signal flow graph of a SIC-SAGE estimator, in accordance with one embodiment of the present invention.

In contrast, for ranging applications in a multipath-rich environment, the serial interference cancellation (SIC) is expected to result in a more stable performance, especially for first arriving path estimation. Unlike the PIC-SAGE algorithm, the SIC-SAGE algorithm orders paths according to their received powers, and the paths are estimated and cancelled successively from the received channel response. The SIC-SAGE algorithm is thus expected to provide a more stable performance compared to the PIC-SAGE algorithm. FIG. 8 shows a signal flow graph of the SIC-SAGE algorithm. As shown in FIG. 8, the E-step used here can be expressed as $$\hat{x}_l(t;\hat{\theta}') = r(t) - \sum_{l'=1}^{l-1} s(t;\hat{\theta}'_{l'}). \tag{7}$$

where the estimate of the complete data $\hat{x}_l(t;\hat{\theta}')$ for the l-th path is estimated by subtracting from the incomplete data all contributions by paths of higher powers and perform the estimation successively. As in the PIC-SAGE algorithm, only one path is estimated during each iteration, with parameters of all the other paths kept constant at their respective last estimated values.

A further complexity reduction can be achieved within the SAGE framework when each of the parameter vectors $\theta_l$, for l=1, ..., L in the matrix Θ is further split into two overlapping subsets $\{\tau_l, \alpha_l\}$ and $\{\phi_l, \alpha_l\}$, and updating these subsets by performing the E- and M-steps successively. The maximization of the log-likelihood function is performed with respect to each subset while keeping the other parameters fixed. The coordinate-wise updating procedure to obtain the estimate $\hat{\theta}''$ for the parameters of the l-th path given the estimate $\hat{\theta}'$ (which contains all the previous estimates of the paths' parameters) is provided as the M-step and given as follows $$\hat{\tau}''_l = \underset{\tau}{\operatorname{argmax}}\{|z(\tau,\hat{\phi}'_l;\hat{x}_l(t;\hat{\theta}'))|^2\}, \tag{8}$$

$$\hat{\phi}''_l = \underset{\phi}{\operatorname{argmax}}\{|z(\hat{\tau}''_l,\phi;\hat{x}_l(t;\hat{\theta}'))|^2\}, \tag{9}$$

$$\hat{\alpha}''_l = \frac{1}{B_{opt} \cdot N_T} \cdot z(\hat{\tau}''_l,\hat{\phi}''_l;\hat{x}_l(t;\hat{\theta}')), \tag{10}$$

where

-continued $$z(\tau, \phi; x_l) = \underbrace{\sum_{b=1}^{B_{opt}} \exp\{j2\pi f_b \sin\phi_l\}}_{\text{Frequency correlation}} \underbrace{\sum_{n=1}^{N_T} \exp\{j2\pi t_n \tau_l\} \cdot x_l(n, b)}_{\text{Delay correlation}} \quad (11)$$

$$= \sum_{b=1}^{B_{opt}} \sum_{b=1}^{N_T} \exp\{j2\pi(t_n \tau_l + f_b \sin\phi_l)\} \cdot x_l(n, b).$$

Figure 9:
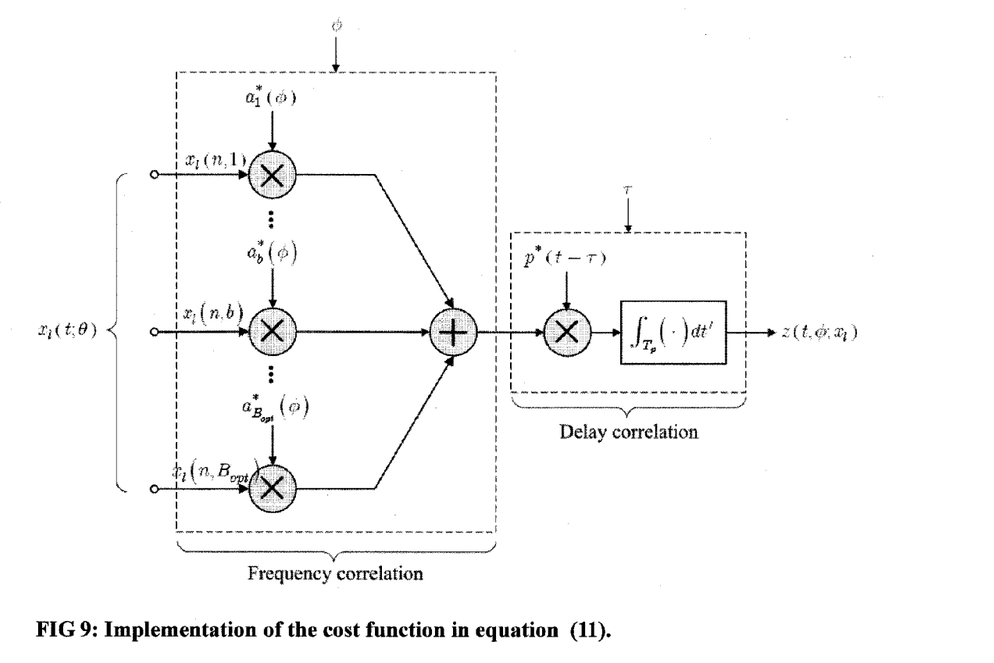
FIG. 9 illustrates an implementation of a cost function between the calculated and the received signal in which a twofold correlation is calculated, in accordance with one embodiment of the present invention.

Equation (11) is the cost function between the calculated and the received signal that includes a twofold correlation. In equation (11), a delay correlation between the noise-corrupted data signal with the conjugate of the transmitted signal is first calculated. Then, a frequency correlation is calculated by multiplying the delay correlation with the conjugate of the steering vector and summing over the optimal signal bandwidth $B_{opt}$. This procedure is summarized in FIG. 9, where these two dimensional (2-D) correlations are implemented as two cascaded finite impulse response filters. Conducting the above coordinate-wise updating procedures once for all L paths define one iteration cycle of the SIC-SAGE algorithm. According to this implementation, the parameter estimates are sequentially and cyclically updated until convergence is reached. Convergence is reached when the difference between the estimated parameters obtained at two consecutive iterations fall below a predefined threshold. Here, the predefined threshold for the TOA is determined by the optimum signal bandwidth, $B_{opt}$ obtained using, for example, the method described in U.S. patent application ("Copending Application II"), entitled "Method for Optimum Bandwidth Selection of Time-of-Arrival Estimators," by C.-C. Chong and F. Watanabe, and which claims benefit of priority to U.S. provisional patent application No. 60/884,569, which was filed on Jan. 11, 2007.

Figure 10:
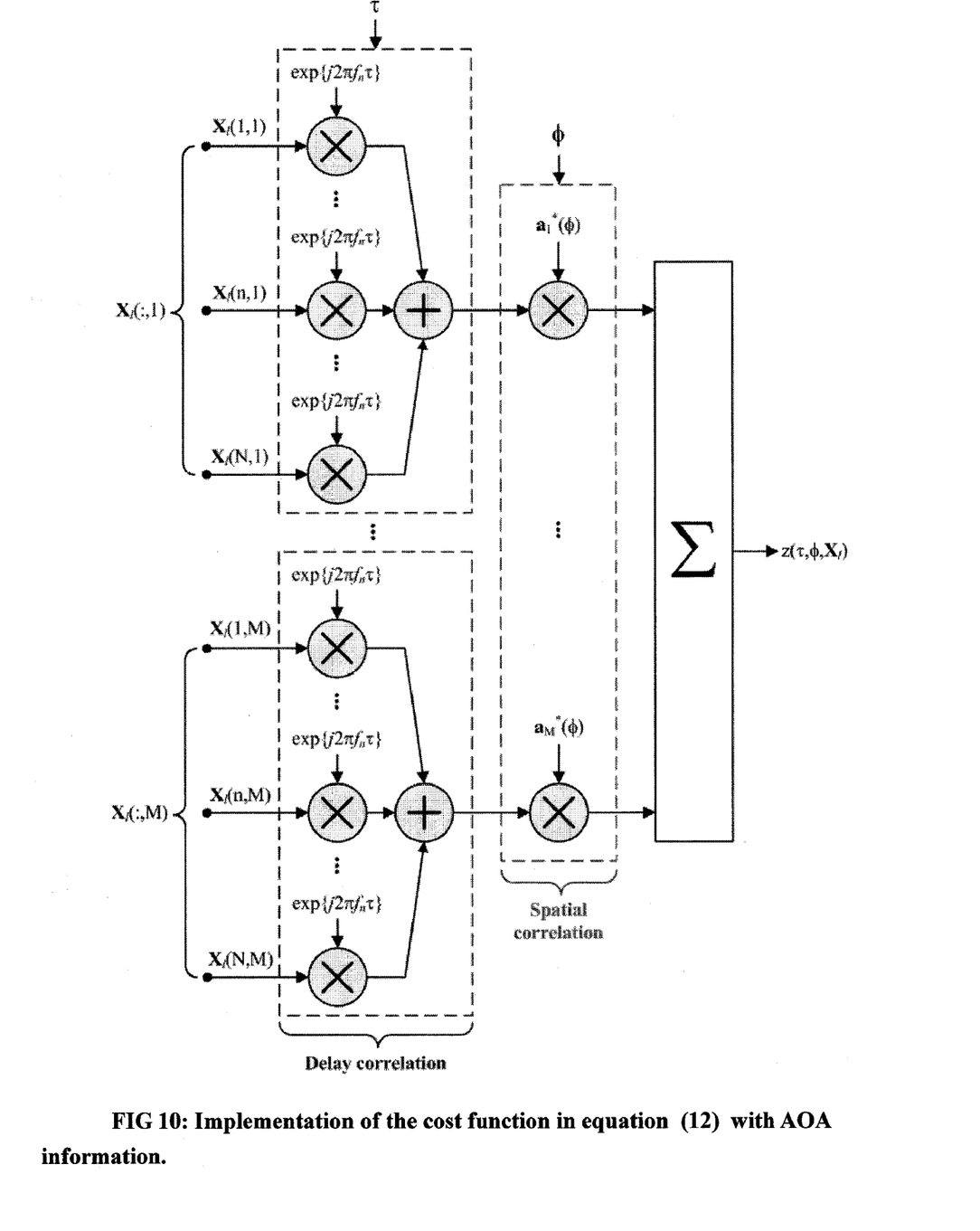
FIG. 10 illustrates an implementation of a cost function extended from the cost function of FIG. 9 by including angle-of-arrival (AOA) information, in accordance with one embodiment of the present invention.

The SIC-SAGE estimator can be easily extended to estimate angle-of-arrival (AOA) information by modifying the cost function given in equation (11) as follows $$z(\tau, \phi; x_l) = a^H(\phi) \cdot U^* \cdot x_l \quad (12)$$

$$= \underbrace{\sum_{m=1}^{M} \exp\{j2\pi(m-1)d\lambda^{-1}\sin\phi_l\}}_{\text{Spatial correlation}}$$

$$\underbrace{\sum_{n=1}^{N_T} \exp\{j2\pi t_n \tau_l\} \cdot x_l(n, m)}_{\text{Delay correlation}}$$

$$= \sum_{m=1}^{M} \sum_{b=1}^{N_T} \exp\{j2\pi(t_n \tau_l + (m-1)d\lambda^{-1}\sin\phi_l)\} \cdot$$

$$x_l(n, b).$$

where M is the number of elements of the antenna array, d is the distance between adjacent antenna elements, and $\lambda$ is the wavelength of the carrier frequency concerned. Here, the predefined threshold for the TOA and the AOA are determined by the optimum signal bandwidth, $B_{opt}$ and the number of elements of the antenna array, M. Note that, in (12), the frequency correlation now is replaced with spatial correlation. FIG. 10 shows the implementation of the cost function with AOA information according to equation (12).

As in any iteration method, the convergence of the SIC-SAGE algorithm depends on favorable initial conditions. Convergence to a global maximum has been observed in the simulation results when the initial estimate is within a significant range of the global maximum. To provide initial conditions that are within the convergence range, the SIC technique and the SIC-SAGE algorithm can be used jointly in the initialization stage. First, the TOA of the first path is estimated via frequency correlation. The signal of the first path can then be reconstructed and is subtracted from the received signal. The SIC-SAGE algorithm can proceed in the same manner for each of the other paths, one by one. For this procedure, the flow of the algorithm is the same as the SIC-SAGE iterations discussed above, however non-coherent phase-combining may be applied to obtain each TOA estimation.

The above detailed description is provided to illustrate the specific embodiments of the present invention and is not intended to be limiting. Numerous variations and modifications within the scope of the present inventions are possible. The present invention is set forth in the following claims.

We claim:

1. A serial interference cancellation space alternating generalization expectation (SIC-SAGE) method for jointly estimating parameters of a multipath channel impulse response (CIR) based upon a signal received in a multipath environment, comprising:
   arranging paths in the multipath CIR according to received powers in the signal to provide a path iteration order for the arranged paths;
   determining an optimum signal bandwidth;
   iterating until convergence according to the path iteration order:
   (a) an expectation step that estimates delay, phase, and amplitude for each component in the multipath CIR; and
   (b) a maximization step that maximizes the value of a cost function to revise the delay, phase, and amplitude estimates, wherein the cost function includes a frequency correlation component and a delay correlation component, and wherein the frequency correlation is calculated by multiplying the delay correlation with a conjugate of a steering vector and summing over the optimum signal bandwidth.

2. The method as in claim 1, wherein the expectation step is based on decomposition of the received signal according to a model which regards the received signal as incomplete data and each signal component for the arranged paths as complete data characterized by the delay, phase, and amplitude estimates and a weighted noise component.

3. The method as in claim 1, wherein the method is practiced in a time-domain based receiver.

4. The method as in claim 1, wherein the method is practiced in a frequency-domain based receiver.

5. The method as in claim 1, wherein paths are estimated and cancelled successively.

6. The method as in claim 1, further comprising an initialization step to provide initial conditions prior to iterating.

7. The method as in claim 6, wherein the initialization step comprises apply a joint SIC and SIC-SAGE techniques.

8. A serial interference cancellation space alternating generalization expectation (SIC-SAGE) estimator for jointly estimating parameters of a multipath channel impulse response (CIR) based upon a signal received in a multipath environment, comprising:
   a control element that arranges paths in the multipath CIR according to received powers in the signal to provide a path iteration order for the arranged paths and determines an optimum signal bandwidth and iterates according to the path iteration order until convergence the operations of:

(a) an expectation element that estimates delay, phase, and amplitude for each component in the multipath CIR; and
(b) a maximization element that maximizes the value of a cost function to revise the delay, phase, and amplitude estimates, wherein the cost function includes a frequency correlation component and a delay correlation component, and wherein the frequency correlation is calculated by multiplying the delay correlation with a conjugate of a steering vector and summing over the optimum signal bandwidth.

9. The estimator as in claim 8, wherein the expectation element decomposes the received signal according to a model which regards the received signal as incomplete data and each signal component for the arranged paths as complete data characterized by the delay, phase, and amplitude estimates and a weighted noise component.

10. The estimator as in claim 8, wherein the estimator is provided in a time-domain based receiver.

11. The estimator as in claim 8, wherein the estimator is provided in a frequency-domain based receiver.

12. The estimator as in claim 8, wherein the control element initializes to provide initial conditions prior to iterating.

13. The estimator as in claim 12, wherein the control element applies joint SIC and SIC-SAGE techniques to initialize.

* * * * *